US010926487B2

(12) United States Patent
Fukushima

(10) Patent No.: US 10,926,487 B2
(45) Date of Patent: Feb. 23, 2021

(54) PRESS FORMING METHOD AND PRESS FORMING APPARATUS FOR FORMED FILM OF SOLID POLYMER ELECTROLYTE FUEL CELL

(71) Applicant: HONDA MOTOR CO., LTD., Tokyo (JP)

(72) Inventor: Yasuhide Fukushima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/911,271

(22) Filed: Mar. 5, 2018

(65) Prior Publication Data

US 2018/0257312 A1    Sep. 13, 2018

(30) Foreign Application Priority Data

Mar. 7, 2017   (JP) .............................. JP2017-042540

(51) Int. Cl.
| | | |
|---|---|---|
| *B29C 69/00* | (2006.01) | |
| *H01M 8/1086* | (2016.01) | |
| *B26F 1/44* | (2006.01) | |
| *B26F 1/40* | (2006.01) | |
| *B26F 1/02* | (2006.01) | |

(Continued)

(52) U.S. Cl.
CPC .............. *B29C 69/001* (2013.01); *B26F 1/02* (2013.01); *B26F 1/40* (2013.01); *B26F 1/44* (2013.01); *H01M 8/1093* (2013.01); *B26F 2001/4481* (2013.01); *B29L 2031/3468* (2013.01); *H01M 2008/1095* (2013.01); *H01M 2300/0082* (2013.01)

(58) Field of Classification Search
CPC . B29C 69/001; B29C 43/40; B29C 2043/403; H01M 8/1018; H01M 8/1093; H01M 2008/1095
See application file for complete search history.

(56) References Cited

U.S. PATENT DOCUMENTS

| | | | | |
|---|---|---|---|---|
| 1,725,461 A | * | 8/1929 | Lewis ........................ | B31F 1/07 |
| | | | | 101/3.1 |
| 1,840,816 A | * | 1/1932 | Kieper ...................... | B31F 1/07 |
| | | | | 101/3.1 |

(Continued)

FOREIGN PATENT DOCUMENTS

| | | |
|---|---|---|
| JP | 53-011385 | 2/1978 |
| JP | 07-329000 | 12/1995 |

(Continued)

*Primary Examiner* — Matthew J Daniels
*Assistant Examiner* — Andrew D Graham
(74) *Attorney, Agent, or Firm* — Amin, Turocy & Watson, LLP

(57) ABSTRACT

A press forming method uses a press forming apparatus for forming a film formed product as a formed film of a solid polymer electrolyte fuel cell. The method includes the step of trimming, in the state where a film material is held between a first die and a holder, by moving a second die closer to the first die to cut the film material using a trimming blade provided for the second die. A blade edge of the trimming blade includes two inclined blade edges inclined toward a proximal side of a blade part from the center to both ends of the blade part in the direction in which the blade part extends.

6 Claims, 9 Drawing Sheets

(51) Int. Cl.
*H01M 8/1018* (2016.01)
*B29L 31/34* (2006.01)

(56) References Cited

U.S. PATENT DOCUMENTS

| | | | | | |
|---|---|---|---|---|---|
| 2,482,981 | A * | 9/1949 | Kamrass | ................ | B32B 27/00 156/199 |
| 3,320,843 | A * | 5/1967 | Schott, Jr. | ................ | B26F 1/02 83/620 |
| 3,522,095 | A * | 7/1970 | Baker, Jr. | ................ | B01J 47/12 429/479 |
| 3,525,279 | A * | 8/1970 | Christian | ................ | B26D 7/10 264/155 |
| 3,996,832 | A * | 12/1976 | Schubert | ................ | B26F 1/14 83/686 |
| 4,104,349 | A * | 8/1978 | Hillgenberg | ................ | B26F 1/40 264/153 |
| 4,242,074 | A * | 12/1980 | Lake | ................ | B26D 3/006 264/163 |
| 4,243,456 | A * | 1/1981 | Cesano | ................ | B29C 51/082 156/214 |
| 5,007,316 | A * | 4/1991 | Ketcham | ................ | B26F 1/14 83/167 |
| 5,238,640 | A * | 8/1993 | Masui | ................ | B29C 43/184 264/266 |
| 5,296,182 | A * | 3/1994 | Thary | ................ | A41D 27/08 264/46.5 |
| 5,447,636 | A * | 9/1995 | Banerjee | ................ | H01M 8/1023 156/308.6 |
| 5,618,567 | A * | 4/1997 | Hara | ................ | B29C 33/0033 425/111 |
| 5,771,764 | A * | 6/1998 | Chatterjee | ................ | C04B 35/486 83/13 |
| 6,186,936 | B1 * | 2/2001 | Smith | ................ | B31F 1/07 101/211 |
| 6,189,589 | B1 * | 2/2001 | Tokunaga | ................ | B29C 51/145 156/497 |
| 6,328,549 | B1 * | 12/2001 | Valyi | ................ | B29C 31/042 425/112 |
| 6,485,591 | B1 * | 11/2002 | Nakao | ................ | B28B 19/0015 156/235 |
| 7,104,192 | B1 * | 9/2006 | Corcoran | ................ | B31F 1/07 101/23 |
| 7,144,244 | B1 * | 12/2006 | Ogawa | ................ | B08B 9/035 425/408 |
| 7,288,336 | B2 * | 10/2007 | Fukuda | ................ | H01M 4/92 429/483 |
| 7,309,542 | B2 * | 12/2007 | Wakahoi | ................ | H01M 4/8626 429/483 |
| 7,476,459 | B2 * | 1/2009 | Wakahoi | ................ | H01M 4/8605 429/437 |
| 7,670,134 | B2 * | 3/2010 | Hwang | ................ | B29C 45/2675 425/450.1 |
| 7,709,123 | B2 * | 5/2010 | Kawabata | ................ | H01M 4/886 429/525 |
| 7,794,891 | B2 * | 9/2010 | Inoue | ................ | H01M 8/0254 429/483 |
| 7,997,894 | B2 * | 8/2011 | Schilles | ................ | B29C 43/203 425/235 |
| 8,465,882 | B2 * | 6/2013 | Noda | ................ | H01M 8/0273 429/482 |
| 8,815,465 | B2 * | 8/2014 | Mitsuta | ................ | H01M 4/8657 429/481 |
| 10,076,856 | B2 * | 9/2018 | Hayes | ................ | B29B 13/023 |
| 2002/0102321 | A1 * | 8/2002 | Davis | ................ | B26F 1/40 425/299 |
| 2002/0162213 | A1 * | 11/2002 | Saelen | ................ | B29C 43/40 29/566.1 |
| 2002/0197525 | A1 * | 12/2002 | Tomita | ................ | H01M 4/8605 429/480 |
| 2003/0091885 | A1 * | 5/2003 | Kobayashi | ................ | H01M 8/0273 29/623.2 |
| 2003/0155685 | A1 * | 8/2003 | Spengler | ................ | B29C 43/36 264/250 |
| 2003/0188616 | A1 * | 10/2003 | Behymer | ................ | B26F 1/44 83/613 |
| 2003/0190521 | A1 * | 10/2003 | Schukar | ................ | H01M 4/881 429/178 |
| 2004/0048126 | A1 * | 3/2004 | Shibata | ................ | H01M 8/02 429/483 |
| 2004/0099994 | A1 * | 5/2004 | Brinkhues | ................ | A61M 5/31513 264/320 |
| 2004/0118304 | A1 * | 6/2004 | Corcoran | ................ | B31F 1/07 101/28 |
| 2004/0146772 | A1 * | 7/2004 | Miyao | ................ | H01M 8/0247 429/443 |
| 2004/0173072 | A1 * | 9/2004 | Ishii | ................ | H01M 8/2404 83/100 |
| 2005/0012237 | A1 * | 1/2005 | Koyama | ................ | B29C 43/36 264/161 |
| 2005/0095495 | A1 * | 5/2005 | Yamada | ................ | C04B 35/486 429/480 |
| 2006/0057448 | A1 * | 3/2006 | Miyauchi | ................ | H01M 8/1004 429/483 |
| 2007/0003816 | A1 * | 1/2007 | Sugita | ................ | H01M 8/0247 429/434 |
| 2007/0003821 | A1 * | 1/2007 | Belchuk | ................ | H01M 8/0273 429/465 |
| 2007/0020504 | A1 * | 1/2007 | Sugita | ................ | H01M 8/0247 429/457 |
| 2007/0042261 | A1 * | 2/2007 | Kohyama | ................ | H01M 8/0247 429/480 |
| 2007/0072758 | A1 * | 3/2007 | Van Oosterhout | ................ | B31F 1/07 493/355 |
| 2007/0184327 | A1 * | 8/2007 | Ishioka | ................ | H01M 8/0273 429/457 |
| 2008/0038613 | A1 * | 2/2008 | Padberg | ................ | C08J 5/2256 29/831 |
| 2008/0248338 | A1 * | 10/2008 | Yano | ................ | H01M 8/0258 429/498 |
| 2008/0292941 | A1 * | 11/2008 | Oda | ................ | H01M 8/026 429/434 |
| 2008/0302255 | A1 * | 12/2008 | Koivukunnas | ................ | B29C 59/046 101/27 |
| 2009/0004539 | A1 * | 1/2009 | Ishikawa | ................ | H01M 8/0273 429/434 |
| 2009/0173442 | A1 * | 7/2009 | Suzuki | ................ | H01M 8/1006 156/297 |
| 2009/0208805 | A1 * | 8/2009 | Wakabayashi | ................ | B29C 66/472 429/429 |
| 2009/0208806 | A1 * | 8/2009 | Izuhara | ................ | C08G 65/4056 429/450 |
| 2009/0291350 | A1 * | 11/2009 | Ishida | ................ | H01M 8/0247 429/499 |
| 2010/0047649 | A1 * | 2/2010 | Yamada | ................ | H01M 8/0273 429/481 |
| 2010/0173222 | A1 * | 7/2010 | Suzuki | ................ | H01M 8/0271 429/483 |
| 2010/0239889 | A1 * | 9/2010 | Uchida | ................ | B29B 13/023 428/826 |
| 2011/0281192 | A1 * | 11/2011 | Jones | ................ | B26F 1/384 429/457 |
| 2012/0021304 | A1 * | 1/2012 | Satake | ................ | B28B 11/10 429/408 |
| 2012/0070752 | A1 * | 3/2012 | Guzda | ................ | H01M 8/04171 429/413 |
| 2012/0161352 | A1 * | 6/2012 | Yamamoto | ................ | H01M 8/0223 264/45.3 |
| 2012/0219874 | A1 * | 8/2012 | Suzuki | ................ | B29C 45/0046 429/480 |
| 2012/0282539 | A1 * | 11/2012 | Oda | ................ | H01M 8/242 |
| 2012/0321987 | A1 * | 12/2012 | Goto | ................ | H01M 8/0258 429/480 |
| 2013/0029246 | A1 * | 1/2013 | Akiyama | ................ | H01M 4/8605 429/480 |
| 2013/0037760 | A1 * | 2/2013 | Maeda | ................ | H01M 8/0213 252/511 |

(56) References Cited

U.S. PATENT DOCUMENTS

| | | | | |
|---|---|---|---|---|
| 2013/0068376 | A1* | 3/2013 | Kuwahara | B29C 35/12 156/219 |
| 2013/0101917 | A1* | 4/2013 | Okanishi | H01M 8/1004 429/480 |
| 2013/0273402 | A1* | 10/2013 | Tsutsumi | H01M 4/48 429/99 |
| 2014/0017579 | A1* | 1/2014 | Hata | H01M 8/1253 429/408 |
| 2014/0127608 | A1* | 5/2014 | Sakamoto | C09J 7/20 429/482 |
| 2014/0234749 | A1* | 8/2014 | Tanaka | H01M 8/0271 429/481 |
| 2014/0338825 | A1* | 11/2014 | Breault | B29C 48/475 156/244.18 |
| 2015/0072265 | A1* | 3/2015 | Ishida | H01M 8/242 429/483 |
| 2015/0164746 | A1* | 6/2015 | Costello | A61B 5/07 264/112 |
| 2016/0002000 | A1* | 1/2016 | Abe | B65H 37/04 493/463 |
| 2016/0013504 | A1* | 1/2016 | Yamamoto | H01M 8/1004 429/480 |
| 2016/0016327 | A1* | 1/2016 | Seal | B32B 37/10 428/140 |
| 2016/0141635 | A1* | 5/2016 | Kanno | H01M 8/0232 429/514 |
| 2017/0338497 | A1* | 11/2017 | Tatsuno | B32B 5/02 |
| 2018/0034071 | A1* | 2/2018 | Eickhoff | H01M 8/04753 |
| 2018/0040907 | A1* | 2/2018 | Ishida | H01M 8/0258 |
| 2018/0175407 | A1* | 6/2018 | Lee | H01M 8/0297 |
| 2018/0226657 | A1* | 8/2018 | Mukasa | B26D 7/1863 |
| 2018/0257312 | A1* | 9/2018 | Fukushima | B29C 69/001 |

FOREIGN PATENT DOCUMENTS

| | | |
|---|---|---|
| JP | 2001-076743 | 3/2001 |
| JP | 2002-096320 | 4/2002 |
| JP | 2003-022820 | 1/2003 |
| JP | 2003-260693 | 9/2003 |
| JP | 2013-047117 | 3/2013 |
| JP | 2016-024937 | 2/2016 |

* cited by examiner

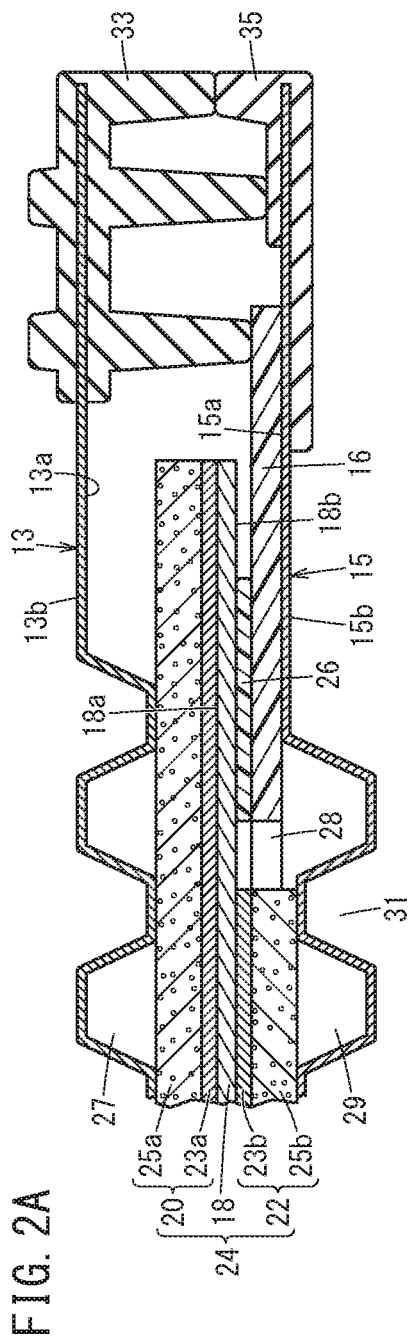
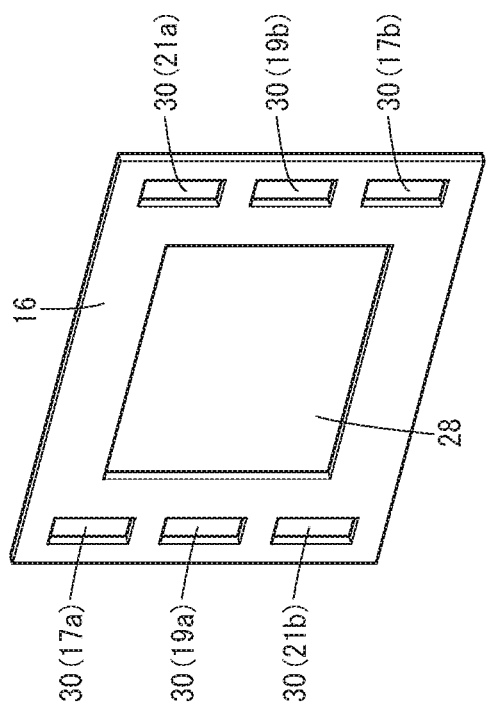
FIG. 2A
FIG. 2B

FIG. 3

PRESS FORMING METHOD AND PRESS FORMING APPARATUS FOR FORMED FILM OF SOLID POLYMER ELECTROLYTE FUEL CELL

CROSS-REFERENCE TO RELATED APPLICATION

This application is based upon and claims the benefit of priority from Japanese Patent Application No. 2017-042540 filed on Mar. 7, 2017, the contents of which are incorporated herein by reference.

BACKGROUND OF THE INVENTION

Field of the Invention

The present invention relates to a press forming method of and a press forming apparatus for forming a film shaped product as a formed film of a solid polymer electrolyte fuel cell. The formed film is provided for a solid polymer electrolyte membrane of the solid polymer electrolyte fuel cell, protrudes outward from the solid polymer electrolyte membrane, and extends in a flame shape.

Description of the Related Art

For example, in a press forming method disclosed in Japanese Laid-Open Patent Publication No. 2003-022820, an upper die goes down relative to a lower die, in which a rectangular film member is provided. A trimming blade provided for the upper die is used to cut the marginal portion of the film member to obtain a solid polymer electrolyte membrane of a fuel cell.

SUMMARY OF THE INVENTION

In general, a blade edge of a trimming blade for cutting a film material extends in a direction perpendicular to the upward/downward movement direction of an upper die (in parallel to the surface of the film material). Therefore, at the time of trimming, the entire blade edge of the trimming blade contacts the film material substantially at the same time. In this case, the load required for trimming (load applied to the press forming apparatus) is large, and the life time of the press forming apparatus tends to be short.

The present invention has been made taking the problem of this type into account, and an object of the present invention is to provide a press forming method and a press forming apparatus for a formed film of a solid polymer electrolyte fuel cell in which it is possible to prolong the life time of the press forming apparatus by reducing the press load required for trimming.

In order to achieve the above object, the present invention provides a press forming method of forming a film shaped product as a formed film of a solid polymer electrolyte fuel cell. The formed film is provided for a solid polymer electrolyte membrane of the solid polymer electrolyte fuel cell, protrudes outward from the solid polymer electrolyte membrane, and extends in a frame shape. The method includes the steps of holding a film material between a first die and the holder, and trimming, in the state where the film material is held between a first die and the holder, by moving a second die closer to the first die to cut the film material using a trimming blade provided for the second die. The trimming blade includes a blade part extending in a direction intersecting with a moving direction of the trimming blade and having a blade edge formed at a distal end of the blade part, and the blade edge includes two inclined blade edges inclined toward the proximal side of the blade part from the center to both ends of the blade part in the direction in which the blade part extends.

In the press forming method, preferably, outer periphery of the formed film has a rectangular shape, the trimming blade includes two blade parts at opposite positions, and in the trimming step, two opposite sides of the formed film are formed by cutting the film material by the blade parts, respectively.

Preferably, the press forming method includes the step of piercing the film material, in the state where the film material is held between the first die and the holder, by forming a through hole in the film material using the punch provided for the second die, and in the trimming step, the trimming blade contacts the film material preferably after the through hole has been formed in the film material in the piercing step.

Preferably, the press forming method includes the step of positioning the film material relative to the first die before the holding step, by inserting a first positioning pin of the first die into a first positioning hole formed in the film material and inserting a second positioning pin of the first die into the second positioning hole formed in the film material, and in the piercing step, portion of the film material where the first positioning hole is present is cut away, and in the trimming step, portion of the film material where the second positioning hole is present is cut away.

In the press forming step, preferably, the punch has an inner hole configured to allow the first positioning pin to be inserted into the inner hole, and in the piercing step, the through hole is formed in the film material in such a manner that the first positioning pin is positioned in the inner hole of the punch.

The present invention provides a press forming apparatus for forming a film shaped product as a formed film of a solid polymer electrolyte fuel cell. The formed film is provided for a solid polymer electrolyte membrane of the solid polymer electrolyte fuel cell, protrudes outward from the solid polymer electrolyte membrane, and extends in a frame shape. The apparatus includes a first die where the film material is provided, a second die configured to be movable in a direction closer to or away from the first die, a holder configured to hold the film material between the first die and the holder, and a trimming blade provided for the second die, and configured to cut the film material. The trimming blade includes a blade part extending in a direction intersecting with a moving direction of the trimming blade and having a blade edge formed at a distal end of the blade part, and the blade edge includes two inclined blade edges inclined toward the proximal side of the blade part from the center to both ends of the blade part in the direction in which the blade part extends.

In the press forming apparatus, preferably, the inclination angle of the inclined blade edge to a surface of the film material is equal to or greater than 2° and equal to or smaller than 4°

In the press forming apparatus, preferably, the blade edge includes a central blade edge having an angle formed by coupling two inclined blade edges.

In the press forming apparatus, preferably, the second die is provided with a punch configured to form a through hole in the film material, and the blade edge is provided at a position farther from the film material than a distal end of the punch is.

In the press forming apparatus, preferably, the first die is provided with a positioning pin configured to be inserted into a positioning hole formed in the film material, and the punch has an inner hole configured to allow the positioning pin to be inserted in the inner hole at the time of forming the through hole in the film material.

In the present invention, the blade edge includes the two inclined blade edges inclined toward the proximal side of the blade part from the center to both ends of the blade part in the direction in which the blade part extends. Therefore, in the state where the inclined blade edges and the film material are inclined from each other, the trimming blade can move in the thickness direction of the film material. As a result, the contact portion between the inclined blade edge and the film material moves in a direction perpendicular to the thickness direction of the film material (toward both ends in the direction in which the blade part extends). In the structure, in comparison with the case of cutting the film material while bringing the entire blade edge into contact with the film material using the trimming blade having the blade edge extending in parallel to the film material, it is possible to reduce the contact area of the trimming blade with the film material. Thus, it is possible to reduce the press load required for trimming, and prolong the life time of the press forming apparatus.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 2A is a vertical cross sectional view with partial omission, showing the solid polymer electrolyte fuel cell shown in FIG. 1;

FIG. 2B is a perspective view of a reinforcement film shown in FIG. 1;

FIG. 3 is a cross sectional view schematically showing a positioning step of the press forming method using the press forming apparatus for the formed film of the solid polymer electrolyte fuel cell according the embodiment of the present invention;

DESCRIPTION OF THE PREFERRED EMBODIMENTS

Hereinafter, a preferred embodiment of a press forming method and a press forming apparatus for a formed film of a solid polymer electrolyte fuel cell according to the present invention will be described with reference to the accompanying drawings.

A press forming apparatus 10 is used in the press forming method for the formed film of the solid polymer electrolyte fuel cell according to the embodiment for shearing a film material 12 to form a reinforcement film 16 of the solid polymer electrolyte fuel cell (hereinafter referred to as the fuel cell 14).

Figure 1:
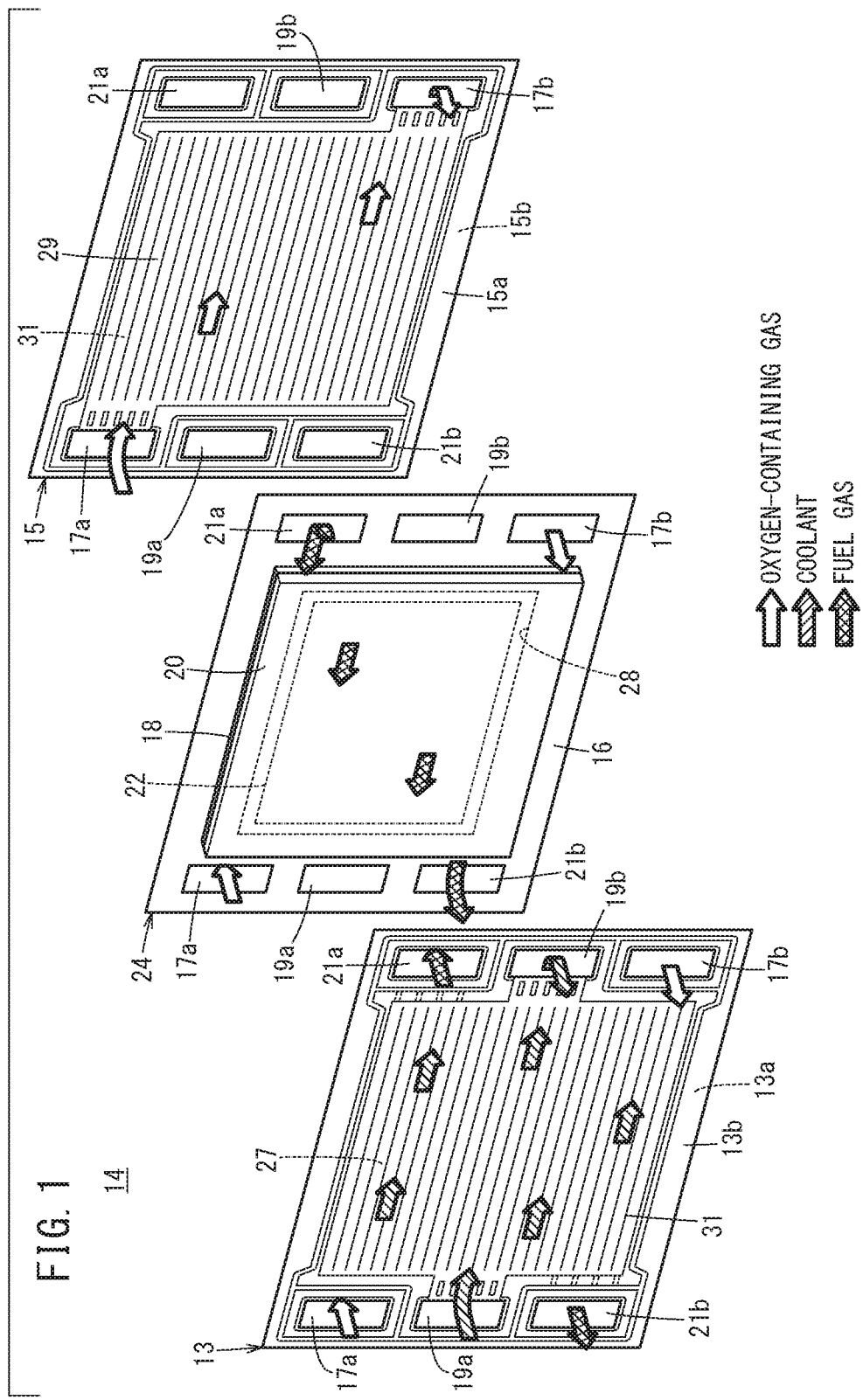
FIG. 1 is an exploded perspective view of a solid polymer electrolyte fuel cell having a reinforcement film formed by a press forming method for a formed film of the solid polymer electrolyte fuel cell according to an embodiment of the present invention.

Firstly, the reinforcement film 16 as a formed film (formed component part) will be described in relation to the fuel cell 14. As shown in FIGS. 1 and 2A, the fuel cell 14 has a rectangular shape. The fuel cell 14 includes a membrane electrode assembly 24 (hereinafter referred to as the "MEA 24") formed by sandwiching a solid polymer electrolyte membrane 18 between an anode 20 and a cathode 22, a rectangular framed shaped reinforcement film 16 provided for the MEA 24, and a pair of separators 13, 15 sandwiching the MEA 24.

In FIG. 1, at one end of the fuel cell 14 (the reinforcement film 16 and each of the separators 13, 15) in a longitudinal direction, an oxygen-containing gas supply passage 17*a*, a coolant supply passage 19*a*, and a fuel gas discharge passage 21*b* are provided. The oxygen-containing gas supply passage 17*a*, the coolant supply passage 19*a*, and the fuel gas discharge passage 21*b* extend through the MEA 24 and the separators 13, 15 in the stacking direction. The oxygen-containing gas is supplied to the fuel cell 14 through the oxygen-containing gas supply passage 17*a*. The coolant is supplied to the fuel cell 14 through the coolant supply passage 19*a*. A fuel gas such as a hydrogen-containing gas is discharged from the fuel cell 14 through the fuel gas discharge passage 21*b*. The oxygen-containing gas supply passage 17*a*, the coolant supply passage 19*a*, and the fuel gas discharge passage 21*b* are arranged in a lateral direction of the fuel cell 14.

At the other end of the fuel cell 14 (the reinforcement film 16 and each of the separators 13, 15) in the longitudinal direction, a fuel gas supply passage 21*a*, a coolant discharge passage 19*b*, and an oxygen-containing gas discharge passage 17*b* are provided. The fuel gas supply passage 21*a*, the coolant discharge passage 19*b*, and the oxygen-containing gas discharge passage 17*b* extend through the MEA 24 and the separators 13, 15 in the stacking direction. The fuel gas is supplied to the fuel cell 14 through the fuel gas supply passage 21*a*. The coolant is discharged from the fuel cell 14 through the coolant discharge passage 19*b*, and the oxygen-containing gas is discharged from the fuel cell 14 through the oxygen-containing gas discharge passage 17*b*. The fuel gas supply passage 21*a*, the coolant discharge passage 19*b*, and the oxygen-containing gas discharge passage 17*b* are arranged in the lateral direction of the fuel cell 14.

The MEA 24 is a so-called stepped MEA. The anode 20 and the solid polymer electrolyte membrane 18 have the same surface size. The surface size of the cathode 22 is slightly smaller than the surface size of the solid polymer electrolyte membrane 18.

For example, the solid polymer electrolyte membrane 18 is a cation ion exchange membrane. The solid polymer electrolyte membrane 18 is formed by impregnating a thin membrane of perfluorosulfonic acid with water, for example. A fluorine based electrolyte may be used for the solid polymer electrolyte membrane 18. Alternatively, an HC (hydrocarbon) based electrolyte may be used for the solid polymer electrolyte membrane 18.

In FIG. 2A, the anode 20 includes an electrode catalyst layer 23a joined to one surface 18a of the solid polymer electrolyte membrane 18 and a gas diffusion layer 25a stacked on the electrode catalyst layer 23a. The outer size of the anode 20 and the outer size the solid polymer electrolyte membrane 18 are the same. Alternatively, the outer size of the anode 20 may be smaller than the outer size of the solid polymer electrolyte membrane 18.

The cathode 22 includes an electrode catalyst layer 23b joined to the other surface 18b of the solid polymer electrolyte membrane 18, and a gas diffusion layer 25b stacked on the electrode catalyst layer 23b. The outer size of the cathode 22 is smaller than the outer size of the solid polymer electrolyte membrane 18. In the case where the outer size of the anode 20 is smaller than the outer size of the solid polymer electrolyte membrane 18, the outer size of the cathode 22 and the outer size of the solid polymer electrolyte membrane 18 may be the same.

For example, each of the electrode catalyst layers 23a, 23b comprises platinum alloy supported on porous carbon particles, and the porous carbon particles are deposited uniformly on the surface of each gas diffusion layer 25a, 25b. Each of the gas diffusion layers 25a, 25b comprises a carbon paper, carbon cloth, etc.

Each of the separators 13, 15 is formed by press forming of a thin metal plate to have a corrugated shape in cross section. For example, the metal plate is a steel plate, a stainless steel plate, an aluminum plate, a plated steel plate, a titanium steel plate, or a metal plate having an anti-corrosive surface by surface treatment. As the separators 13, 15, instead of the metal separators, for example, carbon separators may be used.

As shown in FIGS. 1 and 2A, the separator 13 has a fuel gas flow field 27 on its surface 13a facing the MEA 24. The fuel gas flow field 27 is connected to the fuel gas supply passage 21a and the fuel gas discharge passage 21b. The fuel gas flow field 27 comprises a plurality of straight flow grooves (or wavy flow grooves) extending in the longitudinal direction of the separator 13.

The separator 15 has an oxygen-containing gas flow field 29 on its surface 15a facing the MEA 24. The oxygen-containing gas flow field 29 is connected to the oxygen-containing gas supply passage 17a and the oxygen-containing gas discharge passage 17b. The oxygen-containing gas flow field 29 comprises a plurality of straight flow grooves (or wavy flow grooves) extending in the longitudinal direction of the separator 15.

A coolant flow field 31 is formed between a surface 13b of the separator 13 and a surface 15b of the separator 15. The coolant flow field 31 is connected to the coolant supply passage 19a and the coolant discharge passage 19b. The coolant flow field 31 comprises a plurality of straight flow grooves (or wavy flow grooves) extending in the longitudinal direction of the separators 13, 15.

As shown in FIG. 2A, a seal member 33 is formed around the outer peripheral portion of the separator 13, integrally with or separately from the separator 13. A seal member 35 is formed around the outer peripheral portion of the separator 15, integrally with or separately from the separator 15. For example, each of the seal member 33 and the seal member 35 is made of elastic seal material, cushion material, or packing material such as an EPDM rubber (ethylene propylene diene monomer), an NBR (nitrile butadiene rubber), a fluoro rubber, a silicone rubber, a fluorosilicone rubber, a Butyl rubber, a natural rubber, a styrene rubber, a chloroprene rubber, or an acrylic rubber.

For example, the reinforcement film 16 is made of PPS (polyphenylene sulfide), PPA (polyphthalamide), PEN (polyethylene naphtalate), PES (polyethersulfone), LCP (liquid crystal polymer), PVDF (polyvinylidene fluoride), a silicone rubber, a fluorosilicone rubber, m-PPE (modified polyphenylene ether), PET (polyethylene naphtalate), PBT (polybutylene terephthalate), or modified polyolefin.

As shown in FIGS. 1 to 2B, the reinforcement film 16 is a frame member (resin frame member) for reinforcement of the outer periphery of the solid polymer electrolyte membrane 18. The reinforcement film 16 is joined to the outer peripheral surface of the solid polymer electrolyte membrane 18 using adhesive 26. The reinforcement film 16 is a frame member (resin frame member) which extends around the cathode 22. That is, the cathode 22 is provided in an inner hole 28 of the reinforcement film 16 (see FIG. 2A). The reinforcement film 16 extends outside the solid polymer electrolyte membrane 18, and has a frame shape. Stated otherwise, the reinforcement film 16 has a rectangular outer periphery.

Next, the press forming apparatus 10 for forming the above reinforcement film 16 will be described in relation to the film material 12 as a workpiece before press forming is performed.

Figure 3:
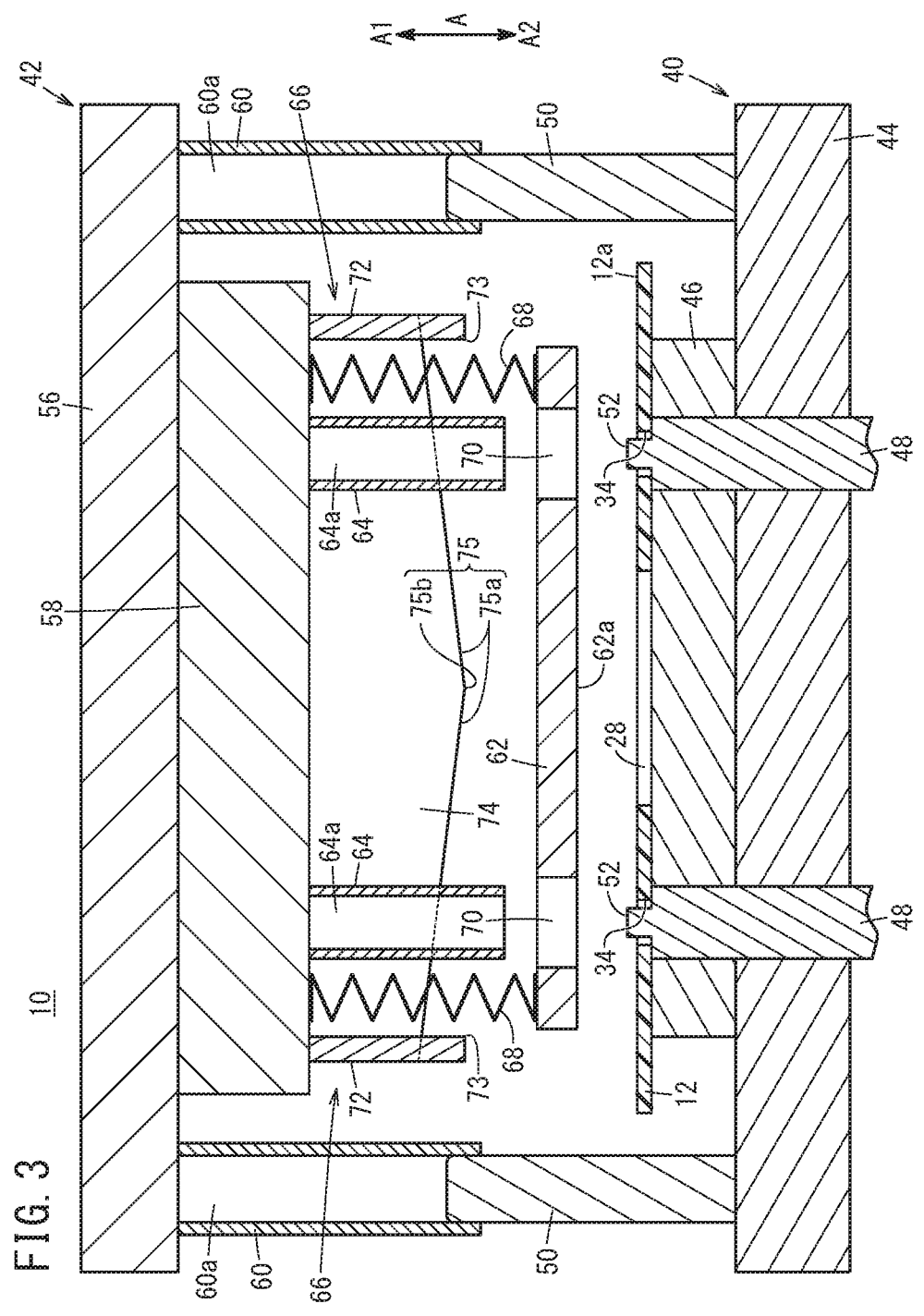
Figure 4:
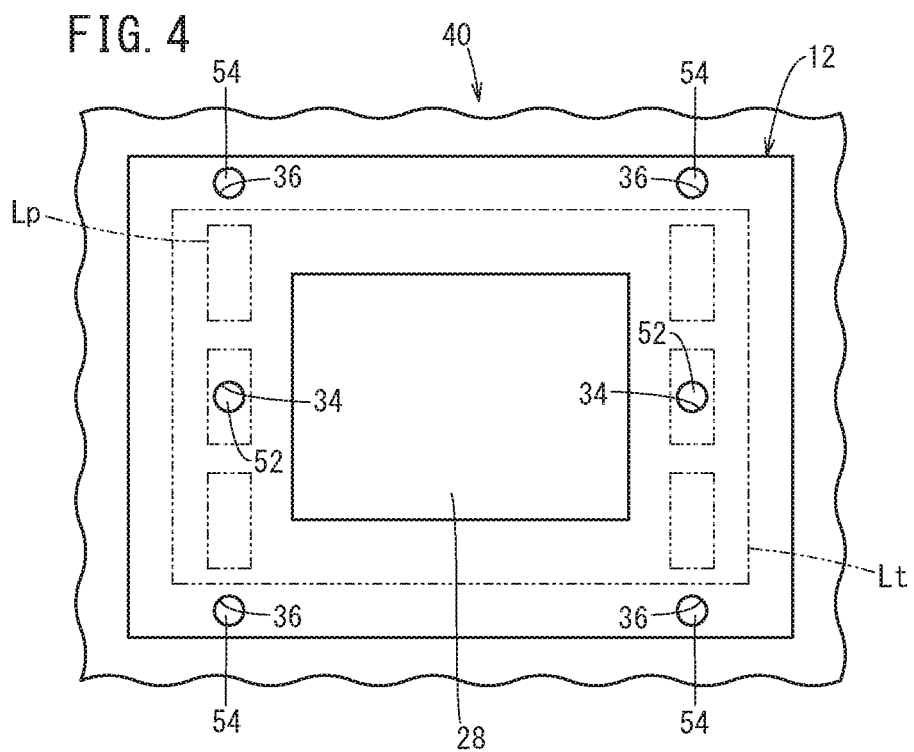
FIG. 4 is a plan view with partial omission, of a first die of the press forming apparatus shown in FIG. 3.

As shown in FIGS. 3 and 4, the film material 12 has a rectangular frame shape, and the outer shape of the film material 12 is larger than the outer shape of the reinforcement film 16. The inner hole 28 for providing the cathode 22 is formed in the film material 12. The oxygen-containing gas supply passage 17a, the oxygen-containing gas discharge passage 17b, the coolant supply passage 19a, the coolant discharge passage 19b, the fuel gas supply passage 21a, and the fuel gas discharge passage 21b are not formed in the film material 12. It should be noted that the inner hole 28 may be formed in the subsequent stage. In the following description, the oxygen-containing gas supply passage 17a, the oxygen-containing gas discharge passage 17b, the coolant supply passage 19a, the coolant discharge passage 19b, the fuel gas supply passage 21a, and the fuel gas discharge passage 21b will also be simply referred to as the through hole(s) 30 without making any distinction.

In FIG. 4, a plurality of (two in the illustrated example) first positioning holes 34 and a plurality of (four in the illustrated example) of second positioning holes 36 are formed in the film material 12. A plurality of first positioning holes 34 are provided at both ends in the longitudinal direction of the film material 12, and the inner hole 28 is positioned between the first positioning holes 34. The plurality of first positioning holes 34 are provided inside piercing lines Lp of the film material 12 (machining lines corresponding to the through holes 30). Each of the first positioning holes 34 is positioned at substantially the center in the lateral direction of the film material 12. The plurality of second positioning holes 36 are provided in the outer marginal portions of the film material 12. The plurality of second positioning holes 36 are positioned on both sides of each of the first positioning holes 34 in the lateral direction of the film material 12. At least two second positioning holes 36 should be provided. Preferably, the second positioning holes 36 are provided at one of the outer marginal portions of the film material 12 in the lateral direction, and spaced from each other in the longitudinal direction.

As shown in FIG. 3, the press forming apparatus 10 includes a first die 40 and a second die 42 which face each other in such a manner that the first die 40 and the second die 42 get closer to and away from each other in the direction indicated by an arrow A. The first die 40 is a fixed die configured to play a role of a lower die, and the second die 42 is a movable die configured to play a role of an upper die.

The first die 40 includes a first base 44, a first die body 46 provided on the first base 44, and a plurality of supports 48. The film material 12 is placed on the first die body 46. The supports 48 are displaceable in the direction indicated by the arrow A relative to the first base 44 and the first die body 46.

A plurality of first guides 50 are provided for the first base 44, for guiding the second die 42 in the direction indicated by the arrow A. The first guides 50 protrude from the first base 44 toward the second die 42 (in a direction indicated by an arrow A1).

Each of the supports 48 passes through the first base 44 and the first die body 46 in the direction indicated by the arrow A. Each of the supports 48, which is a rod member extending in the direction indicated by the arrow A, supports the film material 12 from the back side.

As shown in FIGS. 3 and 4, first positioning pins 52 are provided on the supports 48 facing the first positioning holes 34, among the plurality of supports 48. The first positioning pins 52 are inserted into the first positioning holes 34. The first positioning pins 52 protrude in the direction indicated by the arrow A1 from end surfaces of the supports 48 in the direction indicated by the arrow A1. Further, a plurality of second positioning pins 54 are provided in the first die 40. The second positioning pins 54 are inserted into the second positioning holes 36 of the film material 12 (see FIG. 4).

The second die 42 includes a second base 56 provided movably (vertically) in the direction indicated by the arrow A relative to the first die 40 and a second die body 58 provided for the second base 56. A plurality of hollow second guides 60 having inner holes 60a, respectively, are provided for the second base 56. The first guides 50 are inserted into the inner holes 60a. In the embodiment of the present invention, the second die 42 is guided in the direction indicated by the arrow A by inserting the first guides 50 into the inner holes 60a of the second guides 60. Alternatively, the first guides 50 may have hollow structure, and the second guides 60 may be inserted into the first guides 50. The second die body 58 and the first die body 46 face each other in the direction indicated by the arrow A.

Figure 5:
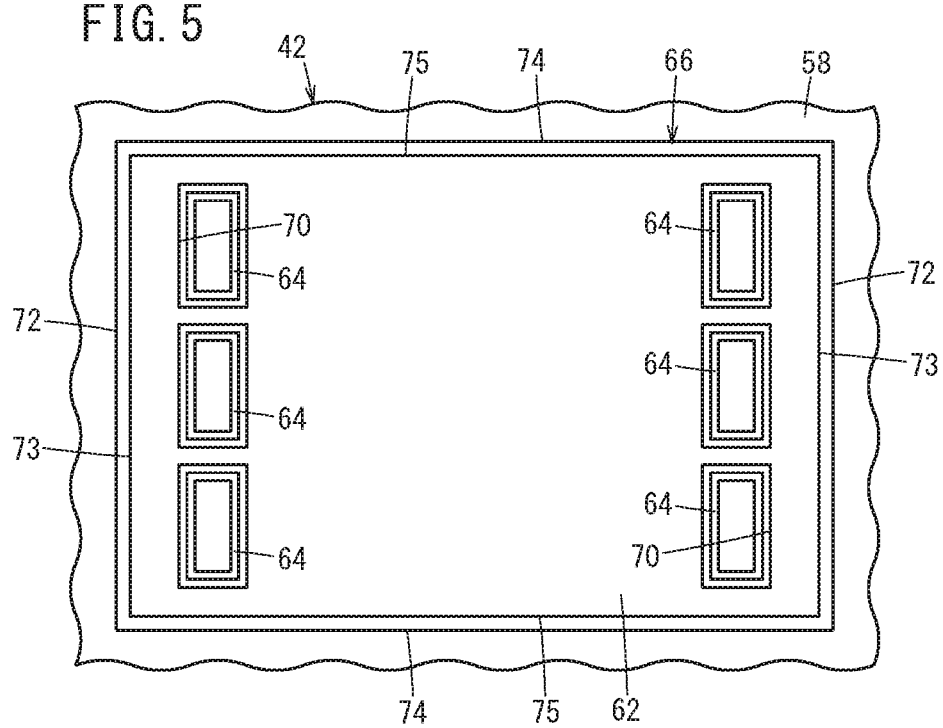
FIG. 5 is a plan view showing a second die and a holder of the press forming apparatus shown in FIG. 3, as viewed from the first die.

As shown in FIGS. 3 and 5, the second die body 58 is equipped with a holder 62 for holding the film material 12 between the holder 62 and the first die 40 (first die body 46), a plurality of (six, in FIG. 5) punches 64 for piercing the film material 12, and a trimming blade 66 for trimming the film material 12.

In the state where the holder 62 is interposed between the film material 12 and the second die body 58, the holder 62 is supported by a plurality of pressing members 68 with respect to the second die body 58. The pressing members 68 press the holder 62 toward the film material 12 (in a direction indicated by an arrow A2). For example, compression springs are used as the pressing members 68. The pressing members 68 may be air cylinders. The holder 62 has a plurality of (six in FIG. 5) insertion holes 70, and the punches 64 are inserted into the insertion holes 70, respectively. The press forming apparatus 10 may have a guide (not shown) for guiding movement of the holder 62 which is caused by compression/decompression of the pressing members 68 (compression springs).

In FIG. 3, the plurality of punches 64 protrude from the second die body 58 in the direction indicated by the arrow A2. Each of the punches 64 has hollow structure. The punches 64 have inner holes 64a, respectively, and the second positioning pins 54 can be inserted into the inner holes 64a. It should be noted that the punches 64 facing the supports 48 which do not have the second positioning pins 54 may have solid structure. In the state before the holder 62 is pressed against the film material 12, the distal end of each of the punches 64 is provided at a position spaced in the direction indicated by the arrow A1 from a surface 62a of the holder 62 which contacts the film material 12.

As shown in FIGS. 3 and 5, the trimming blade 66 has a rectangular frame shape. The trimming blade 66 includes two blade parts 72 for forming the short sides of the outer periphery of the reinforcement film 16 in the film material 12, and two blade parts 74 for forming the long sides of the outer periphery of the reinforcement film 16 in the film material 12. The trimming blade 66 may have only one opposing pair of blade parts 72 or blade parts 74. The two second blade parts 72 face each other, and the two second blade parts 74 face each other. Each of the blade parts 72, 74 extends in a direction intersecting with (perpendicular to) a direction in which the trimming blade 66 moves (in the direction indicated by the arrow A). Specifically, each of the blade parts 72 extends straight in the short side direction of the film material 12, and each of the blade parts 74 extends straight in the long side direction of the film material 12. It should be noted that, for example, in the case where the outer periphery of the reinforcement film 16 includes a curve, these blade parts 72, 74 extends with a curve.

A sharp blade edge 73 is formed in the edge at the distal end of each blade part 72. It should be noted that each of the blade parts 72 may get thinner toward its distal end. The blade edge 73 extends in a direction perpendicular to the direction indicated by the arrow A over the entire length. The blade edge 73 is provided at a position away from the film material 12 (in the direction indicated by the arrow A1), compared to the distal end of the punch 64.

Figure 9A:
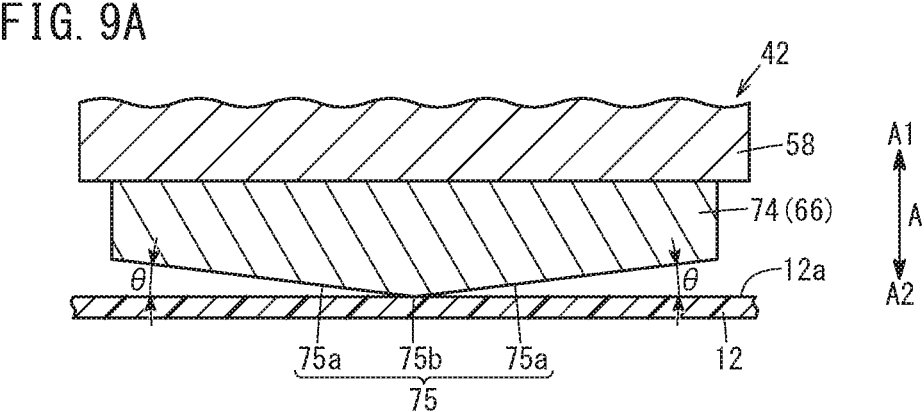
FIG. 9A is a first schematic cross sectional view showing a trimming step.

As shown in FIGS. 3, 5 and 9A, a sharp blade edge 75 is formed in the edge at the distal end of each blade part 74. It should be noted that each of the blade parts 74 may get thinner toward its distal end. In FIGS. 3 and 9A, a blade edge 75 includes two inclined blade edges 75a inclined toward the proximal side of the blade part 74 from the center to both ends of the blade part 74 in the direction in which the blade part 74 extends, and a central blade edge 75b positioned between the inclined blade edges 75a.

The inclined blade edges 75a are inclined straight from the center to both ends of the blade part 74 in the direction in which the blade part 74 extends. Preferably, the inclination angle θ of each inclined blade edge 75a to the surface 12a of the film material 12 is in the range between 2° and 4° (See FIG. 9A). It should be noted that the inclination angle θ can be determined arbitrarily. In the embodiment of the present invention, the inclination angles θ of the inclined blade edges 75a provided on both sides of the central blade edge 75b are the same. However, the inclination angles θ of the inclined blade edges 75a may be different from each other.

The central blade edge 75b is an angle where ends of the two inclined blade edges 75a are coupled together. That is, in the embodiment of the present invention, the central blade edge 75b is positioned at the foremost end of the blade part 74. This central blade edge 75b is provided at a position spaced from the distal end of the punch 64 toward the proximal end (in the direction indicated by the arrow A1)

(see FIG. 3). That is, the central blade edge 75b contacts the surface of the film material 12 after the through holes 30 are formed in the film material 12 by the punches 64. The central blade edge 75b should be positioned in the vicinity of the substantially central position in the direction in which the blade edge 75 extends.

Next, the press forming method using the press forming apparatus 10 according to the embodiment of the present invention will be described.

Figure 6:
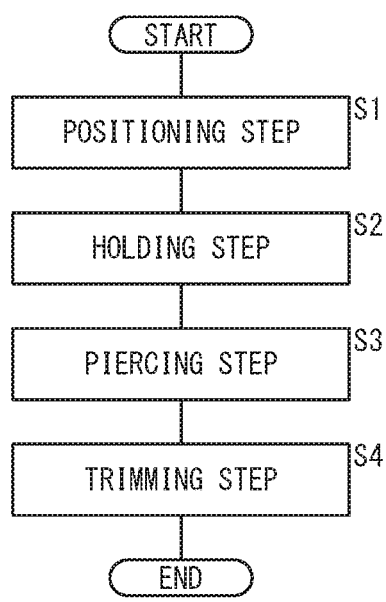
FIG. 6 is a flow chart showing the steps used in the press forming apparatus for the formed film of the solid polymer electrolyte fuel cell according to the embodiment of the present invention.

Firstly, as shown in FIGS. 3 and 4, the film material 12 is positioned relative to the first die 40 (step S1 of FIG. 6: positioning step). Specifically, the first positioning pins 52 of the first die 40 are inserted into the first positioning holes 34 of the film material 12, and the second positioning pins 54 of the first die 40 are inserted into the second positioning holes 36 of the film material 12.

Figure 7:
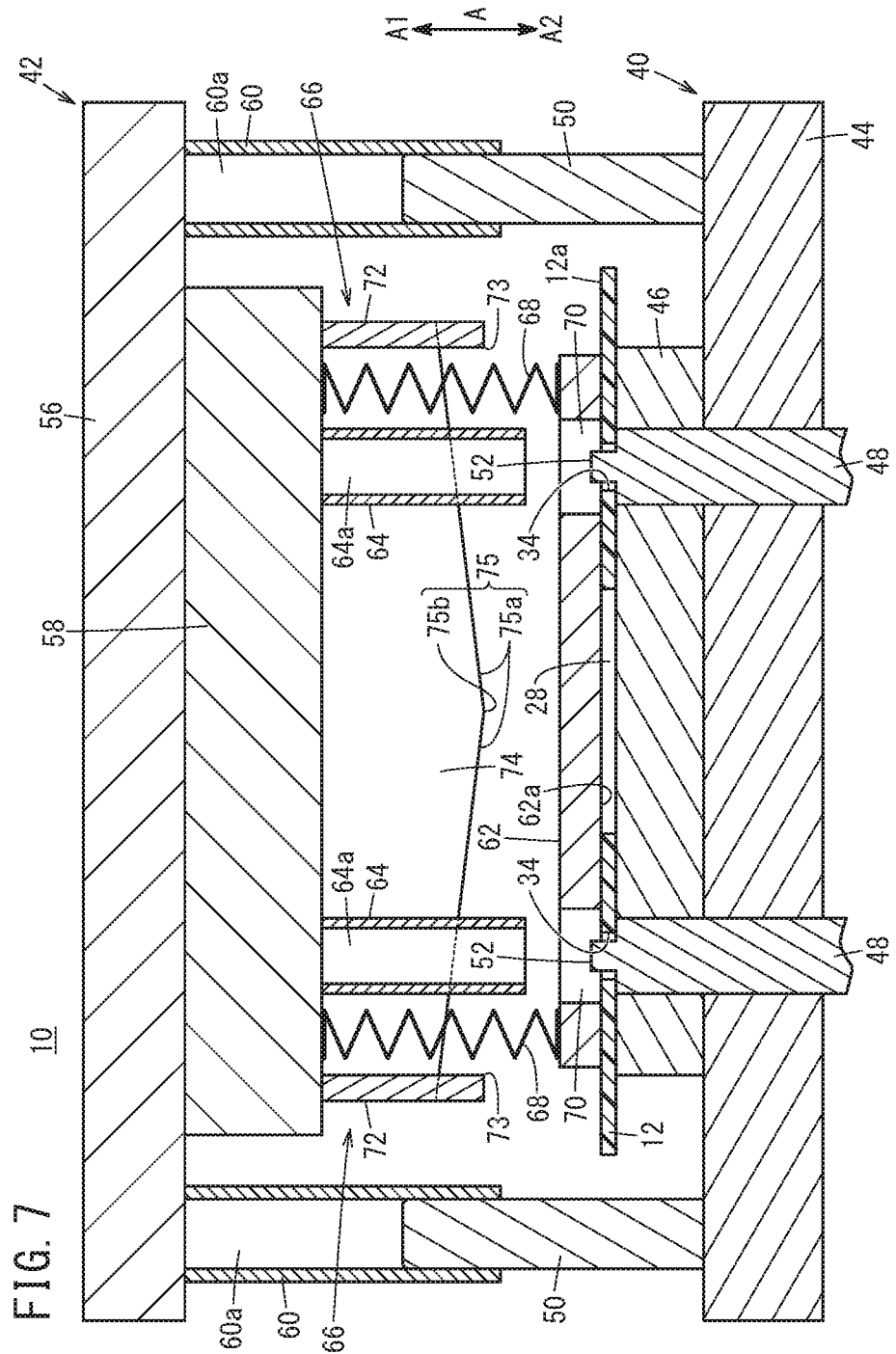
FIG. 7 is a schematic cross sectional view showing a holding step.

Then, as shown in FIG. 7, by moving the second die 42 in the direction indicated by the arrow A2 (closer to the first die 40), the film material 12 is held between the holder 62 and the first die body 46 (step S2 of FIG. 6: holding step). Specifically, when the second die 42 moves in the direction indicated by the arrow A2, the holder 62 contacts the surface 12a of the film material 12, and the pressing members 68 are deformed by compression. Then, since a pressing force is applied to the holder 62 toward the film material 12, from the biasing members 68 which were deformed by compression, the film material 12 is held between the holder 62 and the first die body 46.

Figure 8:
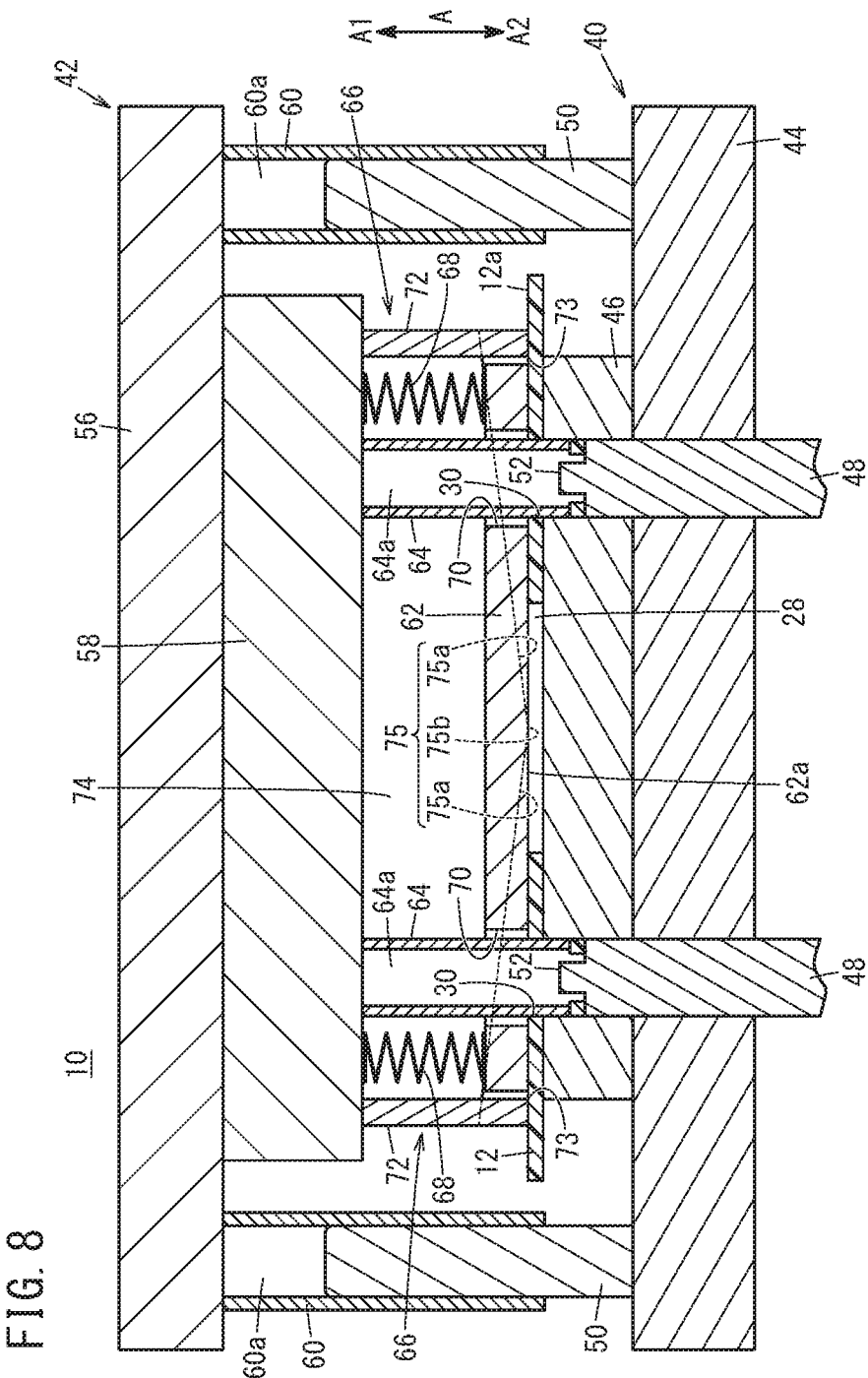
FIG. 8 is a schematic cross sectional view showing a piercing step.

Then, as shown in FIG. 8, by moving the second die 42 further in the direction indicated by the arrow A2 (closer to the first die 40), in the state where the film material 12 is held between the first die body 46 and the holder 62, the punches 64 provided at the second die body 58 are used for shearing of the film material 12 along the plurality of piercing lines Lp (see FIG. 4) (step S3 of FIG. 6: piercing step). Thus, the plurality of through holes 30 are formed in the film material 12.

Thereafter, by moving the second die 42 in a direction indicated by an arrow A2 (closer to the first die 40), in the state where the film material 12 is held between the first holder body 46 and the holder 62, the film material 12 is sheared using the trimming blade 66 provided at the second die body 58 along the trimming lines Lt (see FIG. 4) (step S4 of FIG. 6: trimming step).

Figure 9B:
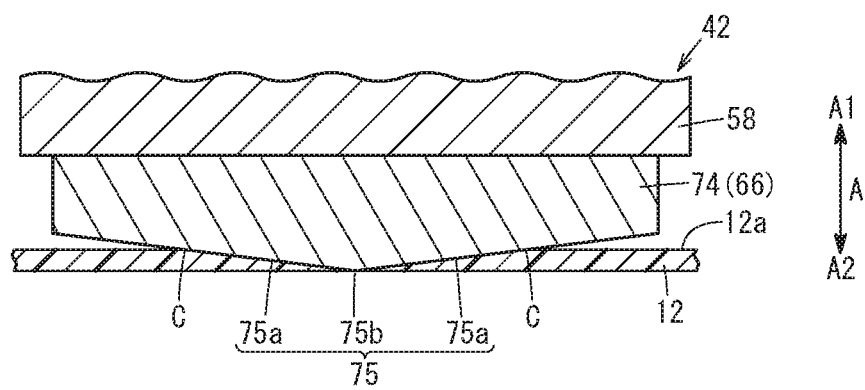
FIG. 9B is a second schematic cross sectional view showing the trimming step.
Figure 9C:
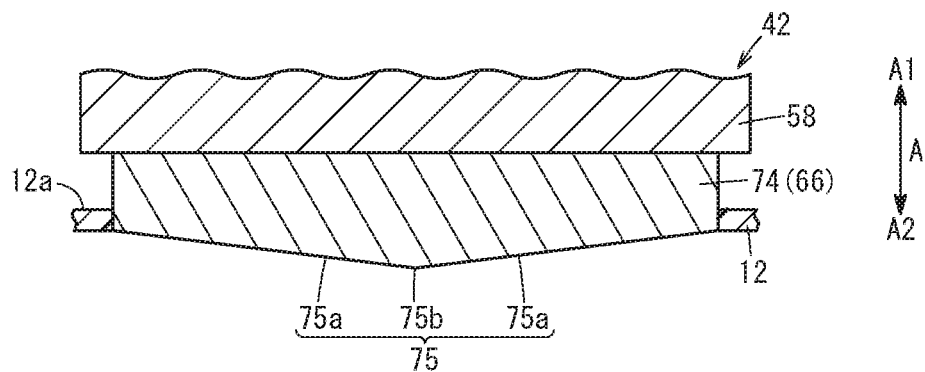
FIG. 9C is a third schematic cross sectional view showing the trimming step.

In this trimming step, after the plurality of through holes 30 are formed in the film material 12 in the piercing step, the central blade edge 75b and the blade edges 73 contact the surface 12a of the film material 12 (see FIG. 9A). Thereafter, in the state where the inclined blade edge 75a and the film material 12 are inclined from each other, the trimming blade 66 moves in the thickness direction of the film material 12 indicated by the arrow A2. As a result, the portions of the inclined blade edge 75a adjacent to the central blade edge 75b contacts the film material 12, and the portions of the inclined blade edge 75a at both ends do not contact the film material 12 (see FIG. 9B). Then, when the trimming blade 66 moves further in the direction indicated by the arrow A2, the contact position C between the inclined blade edge 75a and the film material 12 moves in the direction perpendicular to the direction indicated by the arrow A (both sides in the direction in which the blade part 74 extends). That is, the portion of the inclined blade edge 75a adjacent to the central blade edge 75b does not contact the film material 12, and the portions of the inclined blade edge 75a at both ends contact the film material 12 (see FIG. 9C). Then, the film material 12 is cut by the trimming blade 66. As a result, the reinforcement film 16 is formed.

Next, advantages of the embodiment of the present invention will be described below.

The reinforcement film 16 is formed by the press forming method as a formed film. The reinforcement film 16 is provided for the solid polymer electrolyte membrane 18 of the fuel cell 14. The reinforcement film 16 protrudes outward from the solid polymer electrolyte membrane 18.

The press forming method includes the steps of holding the film material 12 between the first die 40 and the holder 62, and trimming the film material 12, in the state where the film material 12 is held between the first die 40 and the holder 62, by moving the second die 42 closer to the first die 40 to cut the film material 12 by the trimming blade 66 provided for the second die 42. The trimming blade 66 includes the blade part 74 extending in the direction intersecting with (perpendicular to) the moving direction of the trimming blade 66. The blade edge 75 is formed at the distal end of the blade part 74. The blade edge 75 includes the two inclined blade edges 75a inclined toward the proximal side of the blade part 74 from the center to both ends of the blade part 74 in the direction in which the blade part 74 extends. In the trimming step, in the state where the inclined blade edge 75a and the film material 12 are inclined from each other, trimming blade 66 moves in the thickness direction of the film material 12 (in the direction indicated by the arrow A2). As a result, the connection portions C between the inclined blade edges 75a and the film material 12 move in a direction perpendicular to the thickness direction of the film material 12.

In this manner, in comparison with the case of cutting the film material while bringing the entire blade edge into contact with the film material using the trimming blade having the blade edge extending in parallel to the film material, it is possible to reduce the contact area of the trimming blade 66 with the film material 12. Thus, it is possible to reduce the press load (load applied to the press forming apparatus 10) required for trimming. Accordingly, in particular, it is possible to prolong the life time of the press forming apparatus 10, in particular, the trimming blade 66.

The outer periphery of the reinforcement film 16 as a formed component part has a rectangular shape, and the trimming blade 66 includes two opposing blade parts 74. Then, in the trimming step, by cutting the film material 12 using each blade part 74, the opposite two sides (long sides) of the reinforcement film 16 are formed. In this manner, it is possible to effectively reduce the number of steps required for trimming.

In the press forming method, in the state where the film material 12 is held between the first die 40 and the holder 62, the piercing step for forming the through holes 30 in the film material 12 is performed using the punches 64 provided for the second die 42. In the trimming step, after the through holes 30 are formed in the film material 12 in the piercing step, the blade parts 74 are brought into contact with the film material 12. As a result, in comparison with the case where the piercing step and the trimming step are performed at the same time, it is possible to reduce the press load required for these press forming steps.

In the press forming step, the first positioning pins 52 of the first die 40 are inserted into the first positioning holes 34 formed in the film material 12, and the second positioning pins 54 of the first die 40 are inserted into the second positioning holes 36 formed in the film material 12. In this manner, the positioning step for positioning the film material 12 relative to the first die 40 is performed before the holding step. Then, in the piercing step, the portions of the film material 12 where the first positioning holes 34 are present are cut away. In the trimming step, the portions of the film material 12 where the second positioning holes 36 are present (marginal portions of the film material 12) are cut away. In this manner, it becomes possible to improve the machining accuracy in the piercing step and the trimming step without forming any positioning holes in the reinforcement film 16 as the final formed component part.

The punches 64 have the inner holes 64a, respectively, configured to insert the first positioning pins 52 into the inner holes 64a. In the piercing step, the through holes 30 are formed in the film material 12 in such a manner that the first positioning pins 52 are positioned in the inner holes 64a of the punches 64. In this manner, with the simple structure, at the time of performing the piercing step, it is possible to prevent the punches 64 from obstructing the first positioning pins 52.

The inclination angle θ of the inclined blade edge 75a from the surface 12a of the film material 12 is in equal to or greater than 2° and equal to or smaller than 4°. In the structure, it is possible to achieve reduction in the size of the blade part 74 in the direction indicated by the arrow A, and effectively reduce the contact area between the inclined blade edges 75a and the film material 12. Accordingly, it is possible to reduce the press load required for trimming to a greater extent.

The blade edge 75 includes the central blade edge 75b having an angle formed by coupling two inclined blade edges 75a. In the structure, in comparison with the case where the central blade edge 75b extends in a direction perpendicular to the direction indicated by the arrow A, it is possible to reduce the press load.

The blade edges 73 are provided at positions farther from the film material 12 than the distal ends of the punches 64 are. Accordingly, with the simple structure, the trimming step can be performed after the piercing step.

The present invention is not limited to the above described embodiment. The inclined blade edges 75a may be curved convexly in the direction indicated by the arrow A2. The central blade edge 75b may extend straight in the direction in which the blade part 74 extends. The blade edge 73 of the blade part 72 forming the short sides of the reinforcement film 16 may have the same structure as the blade edge 75. In this case, it is possible to reduce the press load required for trimming to a greater extent. Further, the solid polymer electrolyte fuel cell may be a direct methanol fuel cell which consumes methanol as fuel.

What is claimed is:

1. A press forming method of forming a film shaped product as a formed film of a solid polymer electrolyte fuel cell, the resulting formed film being provided for a solid polymer electrolyte membrane of the solid polymer electrolyte fuel cell, protruding outward from the solid polymer electrolyte membrane, and extending in a frame shape, the press forming method comprising the steps of:
   holding a film material between a first die and a holder; and
   trimming the film material, in the state where the film material is held between the first die and the holder, by moving a second die closer to the first die to cut the film material using a trimming blade provided for the second die,
   wherein the trimming blade includes a blade part having ends and extending between the ends in a direction intersecting with a moving direction of the trimming blade and a thickness direction of the trimming blade; and
   the blade part consists of two inclined blade edges inclined constantly toward a direction opposite to the first die respectively from a center to the ends of the blade part in a direction in which the blade part extends, further comprising
   piercing the film material, in the state where the film material is held between the first die and the holder, by forming a through hole in the film material using a punch provided for the second die,
   wherein in the trimming step, after the through hole is formed in the film material in the piercing step, the trimming blade contacts the film material, comprising the step of positioning the film material relative to the first die before the holding step, by inserting a first positioning pin of the first die into a first positioning hole formed in the film material and inserting a second positioning pin of the first die into the second positioning hole formed in the film material,
   wherein in the piercing step, a portion of the film material where the first positioning hole is present is cut away; and
   in the trimming step, a portion of the film material where the second positioning hole is present is cut away.

2. The press forming method according to claim 1, wherein an outer periphery of the resulting formed film has a rectangular shape;
   the trimming blade includes the blade part and another blade part having the same shape as the blade part and the pair is arranged at opposite positions; and
   in the trimming step, two opposite sides of the formed film are formed by cutting the film material by the blade parts.

3. The press forming method according to claim 1, wherein the punch has an inner hole configured to allow the first positioning pin to be inserted into the inner hole; and
   in the piercing step, the through hole is formed in the film material in such a manner that the positioning pin is positioned in the inner hole of the punch.

4. A press forming apparatus for forming a film shaped product as a formed film of a solid polymer electrolyte fuel cell, the formed film to be provided for a solid polymer electrolyte membrane of the solid polymer electrolyte fuel cell, protruding outward from the solid polymer electrolyte membrane, and extending in a frame shape, the pressure forming apparatus comprising:
   a first die where the film material is provided;
   a second die configured to be movable in a direction closer to or away from the first die;
   a holder configured to hold the film material between the first die and the holder; and
   a trimming blade provided for the second die, and configured to cut the film material;
   wherein the trimming blade includes a blade part having ends and extending between the ends in a direction intersecting with a moving direction of the trimming blade and a thickness direction of the trimming blade; and
   the blade part consists of two inclined blade edges inclined constantly toward a direction opposite to the first die respectively from a center to the ends of the blade part in the direction in which the blade part extends, wherein the second die is provided with a punch configured to form a through hole in the film material;
   the blade edge is provided at a position farther from the film material than a distal end of the punch is;

the first die is provided with a positioning pin configured to be inserted into a positioning hole formed in the film material; and the punch has an inner hole configured to allow the positioning pin to be inserted in the inner hole when forming the through hole in the film material.

5. The pressure forming apparatus according to claim 4, wherein the inclination angle of a first inclined blade edge of the two inclined blade edges to a surface of the film material is equal to or greater than 2° and equal to or smaller than 4°.

6. The pressure forming apparatus according to claim 4, wherein the blade edge includes a central blade part having an angle formed by coupling the two inclined blade edges.

\* \* \* \* \*